(12) United States Patent
Milojicic et al.

(10) Patent No.: US 10,838,909 B2
(45) Date of Patent: Nov. 17, 2020

(54) METHODS AND SYSTEMS FOR COMPUTING IN MEMORY

(71) Applicant: HEWLETT PACKARD ENTERPRISE DEVELOPMENT LP, Houston, TX (US)

(72) Inventors: Dejan S. Milojicic, Palo Alto, CA (US); Kirk M. Bresniker, Palo Alto, CA (US); Paolo Faraboschi, Palo Alto, CA (US); John Paul Strachan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 124 days.

(21) Appl. No.: 16/139,913

(22) Filed: Sep. 24, 2018

(65) Prior Publication Data
US 2020/0097440 A1   Mar. 26, 2020

(51) Int. Cl.
*G06F 15/78*     (2006.01)
*G06F 9/30*      (2018.01)
*G06F 9/38*      (2018.01)

(52) U.S. Cl.
CPC ...... *G06F 15/7867* (2013.01); *G06F 9/30145* (2013.01); *G06F 9/3897* (2013.01)

(58) Field of Classification Search
CPC ....... G06F 9/3897; G06F 15/7867; G06F 9/24
See application file for complete search history.

(56) References Cited

U.S. PATENT DOCUMENTS

| | | | |
|---|---|---|---|
| 5,600,845 A | 2/1997 | Gilson et al. | |
| 6,737,958 B1 * | 5/2004 | Satyanarayana ... | H03K 17/6228 340/14.1 |
| 9,733,847 B2 | 8/2017 | Pawlowski et al. | |
| 2004/0107331 A1 | 6/2004 | Baxter et al. | |
| 2006/0149927 A1 * | 7/2006 | Dagan ................. | G06F 9/30076 712/43 |
| 2006/0242385 A1 | 10/2006 | Murakami et al. | |
| 2010/0142243 A1 * | 6/2010 | Baxter ..................... | G11C 5/02 365/51 |
| 2012/0217994 A1 * | 8/2012 | Pino ..................... | H03K 19/173 326/38 |

(Continued)

OTHER PUBLICATIONS

Lange, S. et al.; "SPP1148 booth: Hyperreconfigurable architectures"; Sep. 8-10, 2008; 3 pages.

(Continued)

*Primary Examiner* — Farley Abad
(74) *Attorney, Agent, or Firm* — Nolte Intellectual Property Law Group

(57) ABSTRACT

A method of computing in memory, the method including inputting a packet including data into a computing memory unit having a control unit, loading the data into at least one computing in memory micro-unit, processing the data in the computing in memory micro-unit, and outputting the processed data. Also, a computing in memory system including a computing in memory unit having a control unit, wherein the computing in memory unit is configured to receive a packet having data and a computing in memory micro-unit disposed in the computing in memory unit, the computing in memory micro-unit having at least one of a memory matrix and a logic elements matrix.

20 Claims, 9 Drawing Sheets

(56) References Cited

U.S. PATENT DOCUMENTS

| | | | |
|---|---|---|---|
| 2014/0281379 A1* | 9/2014 | Hutton | G06F 15/76 |
| | | | 712/29 |
| 2014/0340959 A1* | 11/2014 | Antonyan | G11C 11/1673 |
| | | | 365/158 |
| 2017/0185888 A1 | 6/2017 | Chen et al. | |
| 2017/0206113 A1 | 7/2017 | Krig et al. | |
| 2018/0095930 A1* | 4/2018 | Lu | G11C 13/0002 |

OTHER PUBLICATIONS

Borghetti et al., "Memristive' switches enable 'stateful' logic operations via material implication", Nature, vol. 464, Apr. 8, 2010, pp. 873-876.

* cited by examiner (a) CIM micro-unit (b) logic elements matrix (c) physical memristors matrix

METHODS AND SYSTEMS FOR COMPUTING IN MEMORY

BACKGROUND

The so-called "Von Neumann" computer architecture model uses a program stored in memory and a distinct central processing unit that executes the program. This computer architecture model has been used for over seven decades and is used to control the majority of computers in use today.

DETAILED DESCRIPTION

Figure 1:
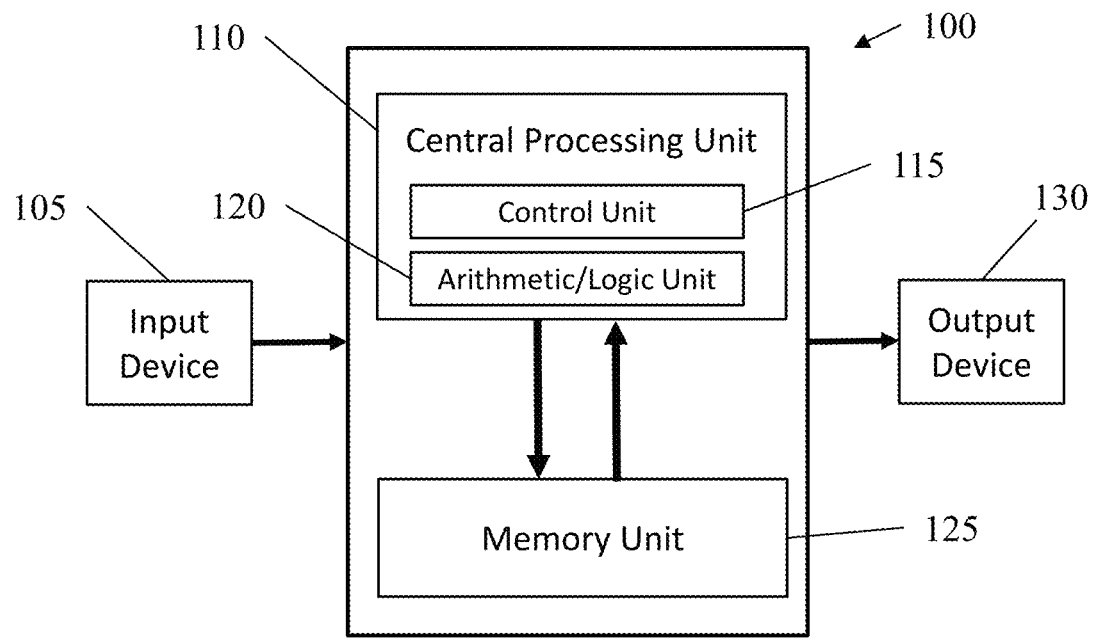
FIG. 1 is a schematic representation of a von Neumann model computing system.

One or more examples are described in detail with reference to the accompanying figures. For consistency, like elements in the various figures are denoted by like reference numerals. In the following detailed description, specific details are set forth in order to provide a thorough understanding of the subject matter claimed below. In other instances, well-known features to one of ordinary skill in the art having the benefit of this disclosure are not described to avoid obscuring the description of the claimed subject matter.

Programming approaches for computing in memory are generally achieved through rigid approaches including, for example, neural networks having fixed weight programming, ternary content-accessible memory, or associative memory. Implementations disclosed herein may provide data flow models for computing in memory that allow computing in memory to achieve increased processing speeds, as well as deploy optimized hardware on the fly. Such implementations may thereby provide high degrees of programmability and reconfigurability for computing in memory applications resulting in improved performance, reduced energy, and easier use.

Implementations disclosed herein may provide a dataflow approach to computing in memory that provides one or more packets that carry any combination of instruction set architecture ("ISA"), code running on the ISA, data, and routing instruction to a control unit of a computing in memory unit of a computer. As the packets arrive to the computer the ISA can be deployed on the fly, the code may be used to provide programs to computing in memory micro-units on the fly, the code may be used to perform computation on data, and the results of the computations may be routed to a data flow phase location identified by the routing instructions.

Depending on the requirements of the operation, not all of the ISA, code, data, and routing instructions need to be included in a particular packet. For example, in certain implementations, after initial configuration by the ISA, only data packets may be sent to the computing in memory units. Alternatively, only a code packet may be sent, thereby allowing the control unit of the computing in memory unit to reprogram the computing in memory micro-units. In still other situations, only a routing instruction packet may be sent, thereby telling either or both of the computing in memory unit and/or computing in memory micro-units where to send processed data that will subsequently arrive (or that might have arrived together with the routing packet). In still other implementations, any combination of ISA, code, data, and routing instructions may be combined to provide the computer the necessary instructions for a particular operation. Because the combinations are variable, the higher degrees of programmability and reconfigurability discussed above may be achieved.

Implementations of the present disclosure may use physical memory matrices, such as memory and/or logic elements matrices to create computing in memory units and micro units, thereby allowing packets to be introduced and processed in a computing system. The data flow used by such computing systems is discussed in detail with respect to the Figures introduced below. These memory matrices may use a variety of memory device technologies, such as SRAM, DRAM, Flash, re-RAM, or memristor.

Turning to FIG. 1, a schematic representation of a von Neumann model computing system is shown. In a von Neumann computing system 100, an input device 105 may provide an input to the computing system 100. The computing system 100 includes a central processing unit 110 having a control unit 115 and an arithmetic/logic unit 120. Computing system 100 further includes a memory unit 125. In use, the central processing unit 110 may fetch instructions from memory unit 125, as well as data, so that computations may be completed by central processing unit 110. After the computations are complete, data may be sent back to memory unit 125 or sent to an output device 130.

Such computing systems 100 become less effective as the size of data sets increase. As data set size increases the time required to send data from memory unit 125 to central processing unit 110 increases. While central processing unit 110 speeds have increased, and memory unit 125 storage sizes have increased to accommodate the larger data sets, the transfer rates between memory unit 125 and central processing unit 110 have not kept up with the increases in central processing unit 110 speeds. As such, the central processing unit 110 experiences more time idle while it waits for the data to be transferred from memory unit 125.

Figure 2:
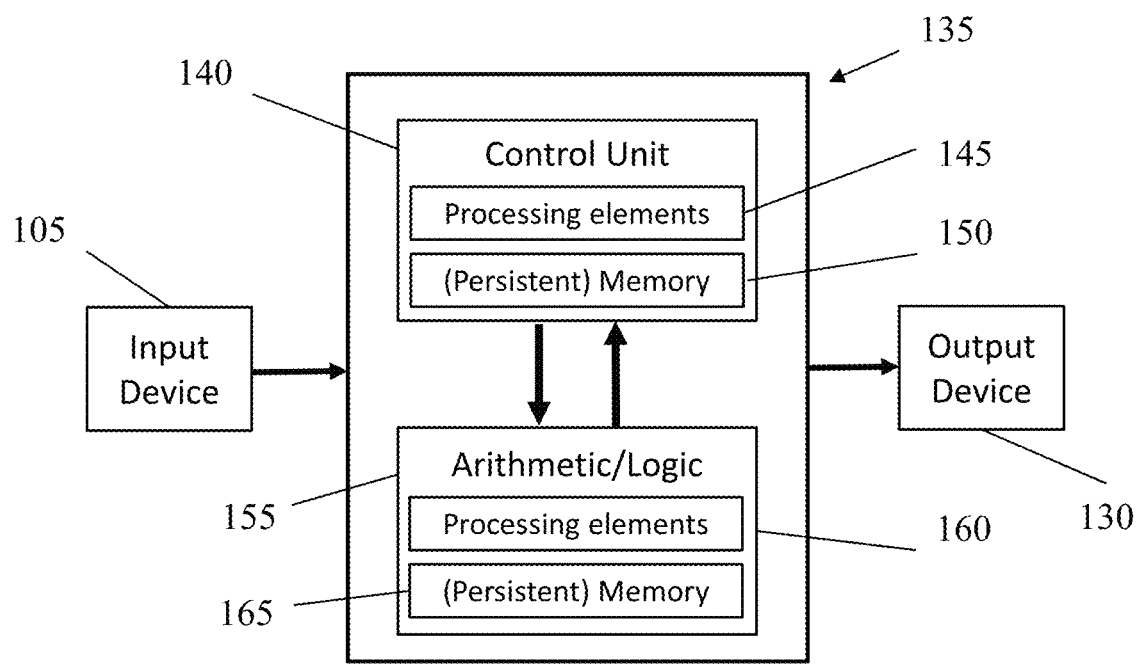
FIG. 2 is a schematic representation a computing in memory model in accordance with one or more example embodiments.

Referring to FIG. 2, a schematic representation of a computing in memory model according to an example embodiment is shown. This example includes a computing system 135 having a control unit 140 having processing elements 145 and memory 150, such as persistent memory. Computing system 135 further includes an arithmetic/logic unit 155 that includes processing elements 160 and memory 165, which may also be persistent memory.

In operation, data may be received from an input device 105. The data may be split between control unit 140 and arithmetic/logic unit 155 wherein separate aspects of the data may be processed independently. In such a computing system 135, data or program code may be stored in the memory 150 in the control unit 140 and/or the memory 165 in the arithmetic/logic unit 155 that is related to the type of processing that is required. For example, data may be stored in memory 165 of arithmetic/logic unit 155 so that as the data is processed by processing elements 160, the data does not have to be transferred from an external memory module. The same process may occur with respect to control unit 140. Because the data does not have to be transferred from external memory modules, the data may be processed more quickly and the processing elements 145 of the control unit 140 and the processing elements 160 of the arithmetic/logic unit 155 may experience less idle time. After the data is processed, the processed data may be sent to output device 130.

Figure 3:
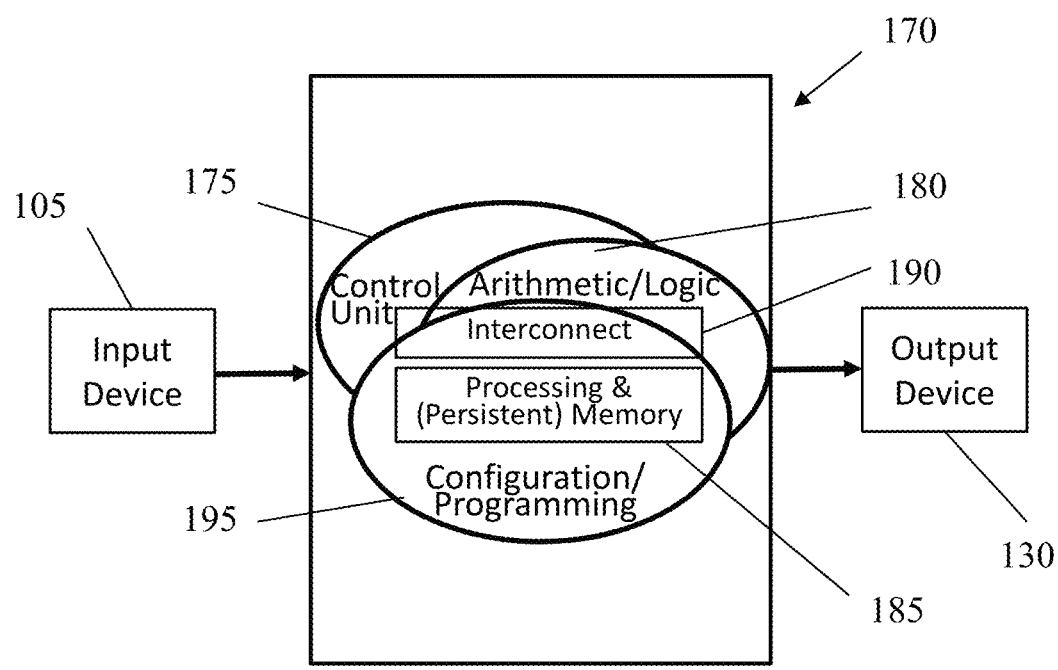
FIG. 3 is a schematic representation of a computing in memory model in accordance with one or more example embodiments.

Referring to FIG. 3, a schematic representation of a computing in memory model according to an example embodiment is shown. FIG. 3 provides the conceptual foundation for computing in memory wherein inputted data may be processed within the receiving memory, thereby not experiencing idle processor time as a result of relatively slow transfer speeds between memory and a processor.

This example implementation shows a computing system 170 having a control unit 175, an arithmetic/logic unit 180, and a configuration/programming unit 185. Computing system 170 further includes an interconnect 190 and a processing and memory unit 195. As with the examples above, memory may be implemented by a variety of devices, including persistent memory devices.

The processing and memory unit 185 may be accessed by control unit 175, arithmetic/logic unit 180, and configuration/programming unit 195. As such, as instructions are received by control unit 175, the entire computing infrastructure may be programmed through configuration/programming unit 185 and the arithmetic/logic unit 180 may execute instructions on received data.

In operation, as data is received from input device 105, processing and memory unit 195 may process the data using arithmetic/logic unit 180 according to programs provided through configuration/programming unit 185. The programs provided through configuration/programming unit 185 are stored in arithmetic/logic unit 180. The processed data may subsequently be sent to output device 130. Because the data is provided to memory that includes processing components, i.e., processing and memory unit 195, there is mitigated data transfer within computing system 170. Additionally, having control unit 175, arithmetic/logic unit 180, and configuration/programming unit 185 directly accessing processing and memory unit 195 allows all actions performed on inputted data to be performed without the requirement to fetch data from an external memory module.

Figure 4:
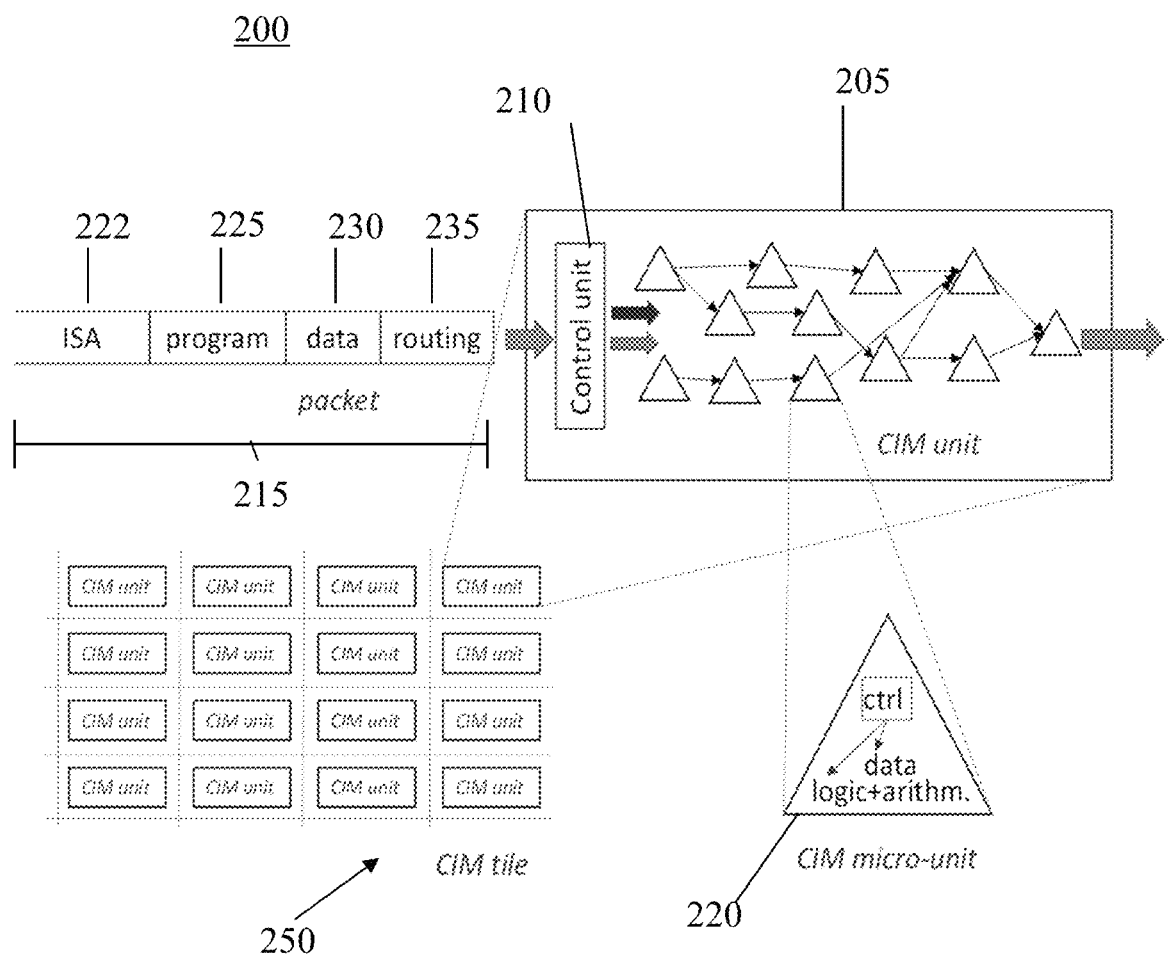
FIG. 4 is a schematic representation of an implementation of a computing in memory model in accordance with one or more example embodiments.

Referring to FIG. 4, a schematic representation of an implementation of a computing in memory model according to an example embodiment is shown. In this implementation computing system 200 includes a computing in memory unit 205 having a control unit 210. Computing in memory unit 205 is configured to receive packets 215 from an external source (not illustrated). The packets 215 may include various types of information including, for example, ISA 222, code 225, data 230, and/or routing instructions 235 or combinations of these types of information. The packets may be used to load, for example, an ISA 222, code 225, data 230, and/or routing instructions 235 onto computing in memory micro-units 220, thereby allowing the computing in memory micro-units to use instructions in the ISA 222, process code 225, compute data 230, and/or route results based on the routing instructions 235.

Instruction set architecture 222 refers generally to the part of a computer processor that is visible to a programmer or compiler. Code 225 refers to program instructions for controlling various components of computing system 200. As used herein, the terms code and programs may be used interchangeably. Data 230 refers to the inputs that will be operated on, and routing instructions 235 refers to where the data, either processed data or unprocessed data, will be sent.

Figure 5:
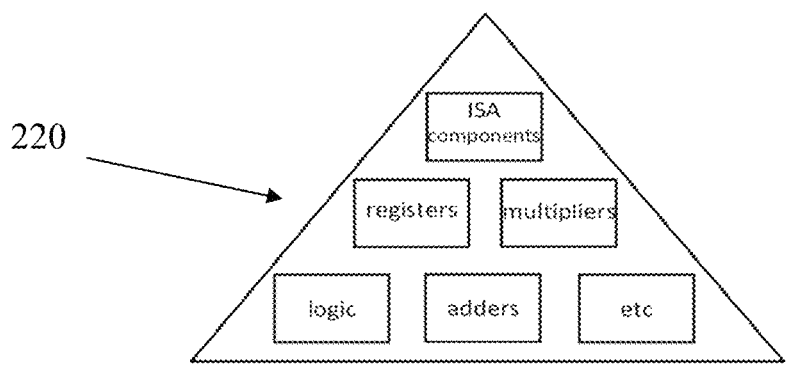
FIG. 5 is a schematic representation of a computing in memory micro-unit in accordance with one or more example embodiments.
Figure 5:
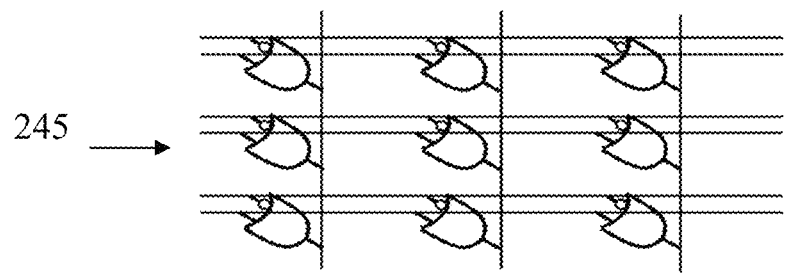
Figure 5:
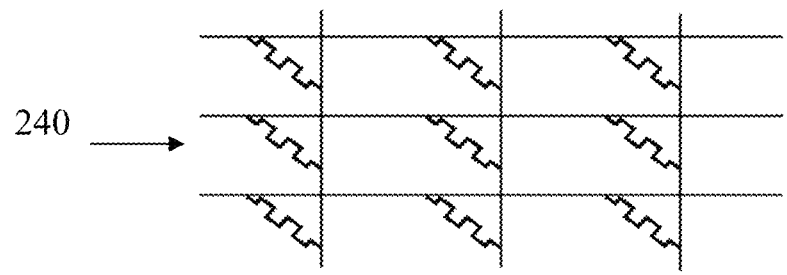

The computing in memory unit 205 also includes a plurality of computing in memory micro-units 220. Referring briefly to FIG. 5, a schematic representation of a computing in memory micro-unit according to an example embodiment is shown. Computing in memory micro-units 220 may include a physical memory matrix 240 and/or a logic elements matrix 245. Examples of physical memory matrix elements 240 may include, for example, memristors. Memristors are a type of passive circuit element that maintains a relationship between the time integrals of current and voltage applied across a two-terminal element. Thus, a memristor is capable of carrying a memory of its past operation. When a voltage to a circuit is turned off, the memristor remembers how much voltage was applied before and for how long the voltage was applied.

Examples of a logic elements matrix 245 may include one or more of registers, multipliers, logic, adders, etc. Logic elements matrix 245 may also be implemented using memristors. Physical memristors matrix 240, logic elements matrix 245, and combinations thereof may be stacked to form a computing in memory micro-unit 220 that is capable of processing data according to predefined program instructions provided through an ISA or code packet 215 received by control unit 210 of FIG. 4. In one example, computing in memory micro-unit 220 may include one physical matrix element 240, while in another example, computing in memory micro-unit 220 may include one logic matrix elements 245. In other example, computing in memory micro-unit 220 may include one physical memristors matrix 240 and one logic elements matrix 245. In still other examples, multiple physical matrix elements 240, multiple logic element matrices 245, and/or combinations thereof may be used to create a computing in memory micro-unit 220.

Referring again to FIG. 4, multiple computing in memory micro-units 220 may be disposed in a computing in memory unit 205 as shown in FIG. 4 and interconnected therein. Each individual computing in memory micro-unit 220 may be capable of processing functions or pushing data forward. Thus, a computing in memory micro-unit 220 may be able to provide processed information to one or more other computing in memory micro-units 220 or provide processed information directly to computing in memory unit 205.

In certain implementations, computing in memory micro-units 220 provide processed data in a linear progression to one other computing in memory micro-unit 220. In other embodiments, a computing in memory micro-unit 220 may provide processed data to multiple computing in memory micro-units 220. In still other implementations, computing in memory micro-units 220 may be interconnected to provide a closed loop. Such closed loop implementations may be useful in processing training sets for specific applications, such as neural networks.

In certain implementations, computing system 200 may include multiple computing in memory units 205. In such a computing system 200, the individual computing in memory units 205 may be arranged in a computing in memory tile 250. The computing in memory tile 250 may include multiple computing in memory units 205 and may be arranged such that the individual computing in memory units 205 are connected therebetween. Accordingly, processed data may be transferable between the multiple individual computing in memory units 205.

During operation, a packet 215 is inputted into the control unit 210 of the computing in memory unit 205. Control unit 210 determines whether the packet 215 contains an ISA 222, code 225, data 230, and/or routing instructions 235, or some combinations of these. In certain embodiments packet 215 may include one of the above or more than one of the above, depending on the type of operation required at the time the particular packet 215 is sent. In a situation where the packet 215 includes ISA 222, control unit 210 may send the ISA 222 to one or more of the computing in memory micro-units 220. Thus, a packet 215 may be sent that modifies, extends or replaces the ISA 222 and the programs for the computing in memory units 205 and micro-units 220.

In a situation where a packet 215 is sent that includes code 225, control unit 210 may receive the code 225 and direct the change in programming to one or more of the computing in memory micro-units 220. Because code 225 may be sent independently, programs may be loaded onto computing in memory micro-units 220 at any time, thereby allowing the reprogramming to be dynamic.

Similarly, where a packet 215 is sent that includes data 230, control unit 210 may receive the data 230 and direct the data 230 to one or more computing in memory micro-units 220. In a situation where a packet 215 is sent that includes routing instructions 235, control unit 210 may receive the routing instructions 235 and actuate the connectedness of one or more computing in memory micro-units 220.

In certain situations, a packet 215 may be sent that includes multiple types of information. For example, in one implementation a packet 215 may be sent that includes both code 225 and data 230. The control unit 210 may send the change in programming code 225 to the correct computing in memory micro-units 220 and at the same time send the data to the correct computing in memory micro-units 220. Both operations may occur simultaneously, thereby allowing computing in memory micro-units 220 to be programmed and compute data 230 at the same time.

Similarly, a packet 215 may be sent that includes code 225 and routing instructions 235. Because both the code 225 can be sent to computing in memory micro-units 220 and routing instructions 235 sent to computing in memory micro-units 220, modification of programming and routing may occur at the same time. Also, because packets 215 may be sent with routing instructions 235, the routing of information between computing in memory micro-units 220 and/or computing in memory units 205 may be dynamically modified.

After processing, modified packets of information may be output from computing in memory unit 205 and sent to external devices (not shown), other computing in memory units 205, computing in memory micro-units 220, or other components not expressively identified herein. Because ISAs 222, code 225, data 230, and routing instructions 235 may be entered individually or in batch, data may be entered on the fly, computing system 200 may be programmed on the fly, and programming, processing, and routing functions may be dynamically adjusted to meet the needs of a particular computing operation.

Figure 6:
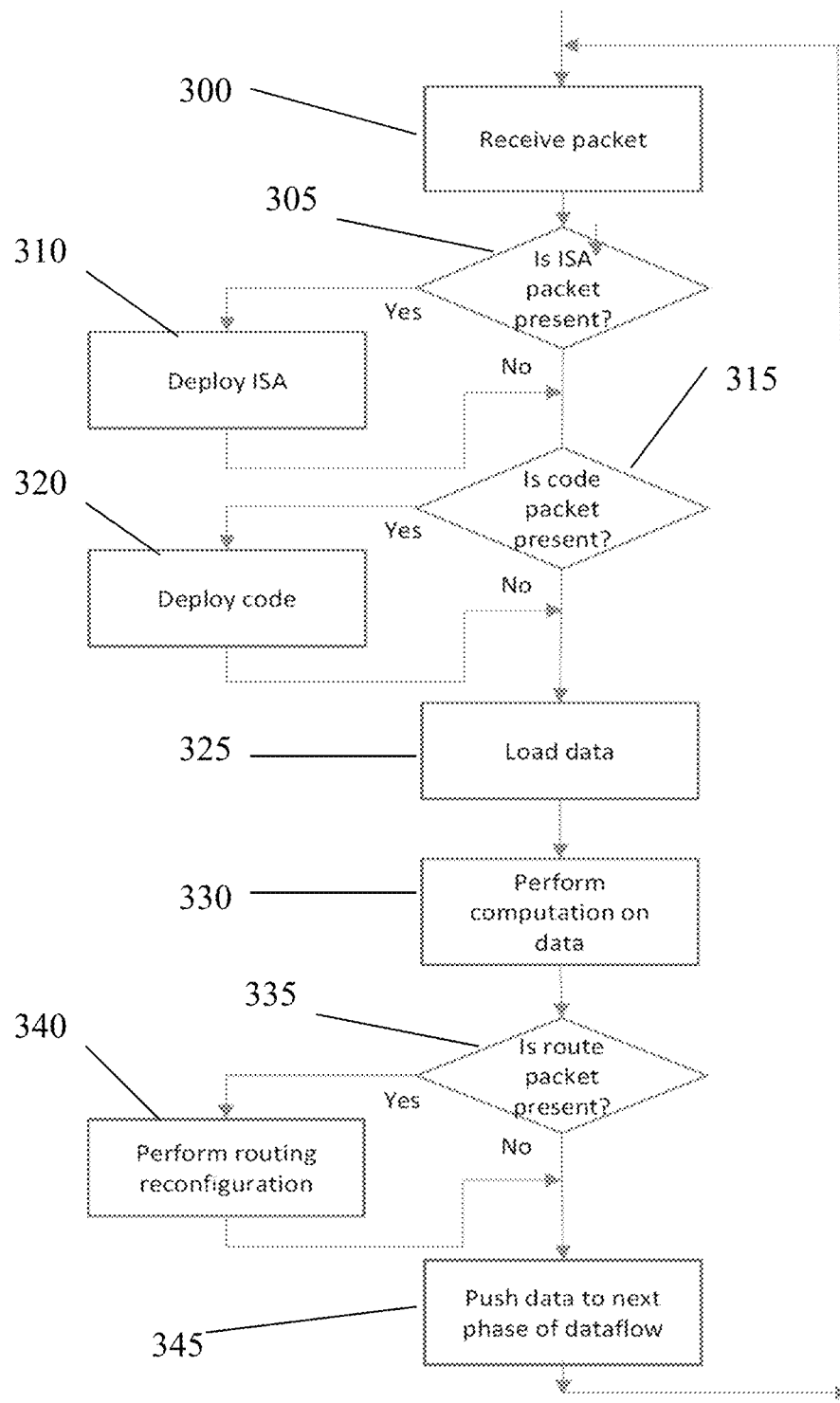
FIG. 6 is a flowchart representing an algorithm for processing packets in a computing in memory unit in accordance with one or more example embodiments.

Referring to FIG. 6, a flowchart representing an algorithm for processing packets in a computing in memory unit according to another example embodiment is shown. This example provides an exemplary algorithm that may be used by control unit (e.g., 210 of FIG. 4) for processing packets as they are received by a computing in memory unit (e.g., 205 of FIG. 4).

Initially, a packet is received 300 and the control unit determines whether the packet is an ISA packet or whether an ISA is present in the packet 305. If the answer is yes, the packet is deployed 310. In the event an ISA packet is present 315, after the ISA is deployed 310, control unit determines whether a code packet is present 315.

If a code packet is present 315, the control unit orders the code to be deployed 320. After code is deployed 320, control unit proceeds to load data 325 from the packet. If a code packet is not present 315, the control unit loads data 325 from the packet. After data is loaded 325 onto computing in memory micro-units, computations are performed on the data 330. After the computations are performed, the control unit determines whether a routing packet is present 335. If a routing packet is present 335, the control unit performs a routing reconfiguration 340, thereby telling one or more computing in memory micro-units where to route the processed data.

After reconfigurations 340, the processed data may be pushed to the next phase of the data flow 345. In the event no routing packet is present 335, the processed data may be pushed 345 to the phase of the data flow that was previously used. After this process is complete, the control unit may process additional packets as they are inputted.

Those of ordinary skill in the art having benefit of the present disclosure will appreciate that the above process is one example of how a control unit may operate in processing packets. Other examples may also be employed that simplify, complexify, or otherwise modify the processing of packets received by control units.

Figure 7:
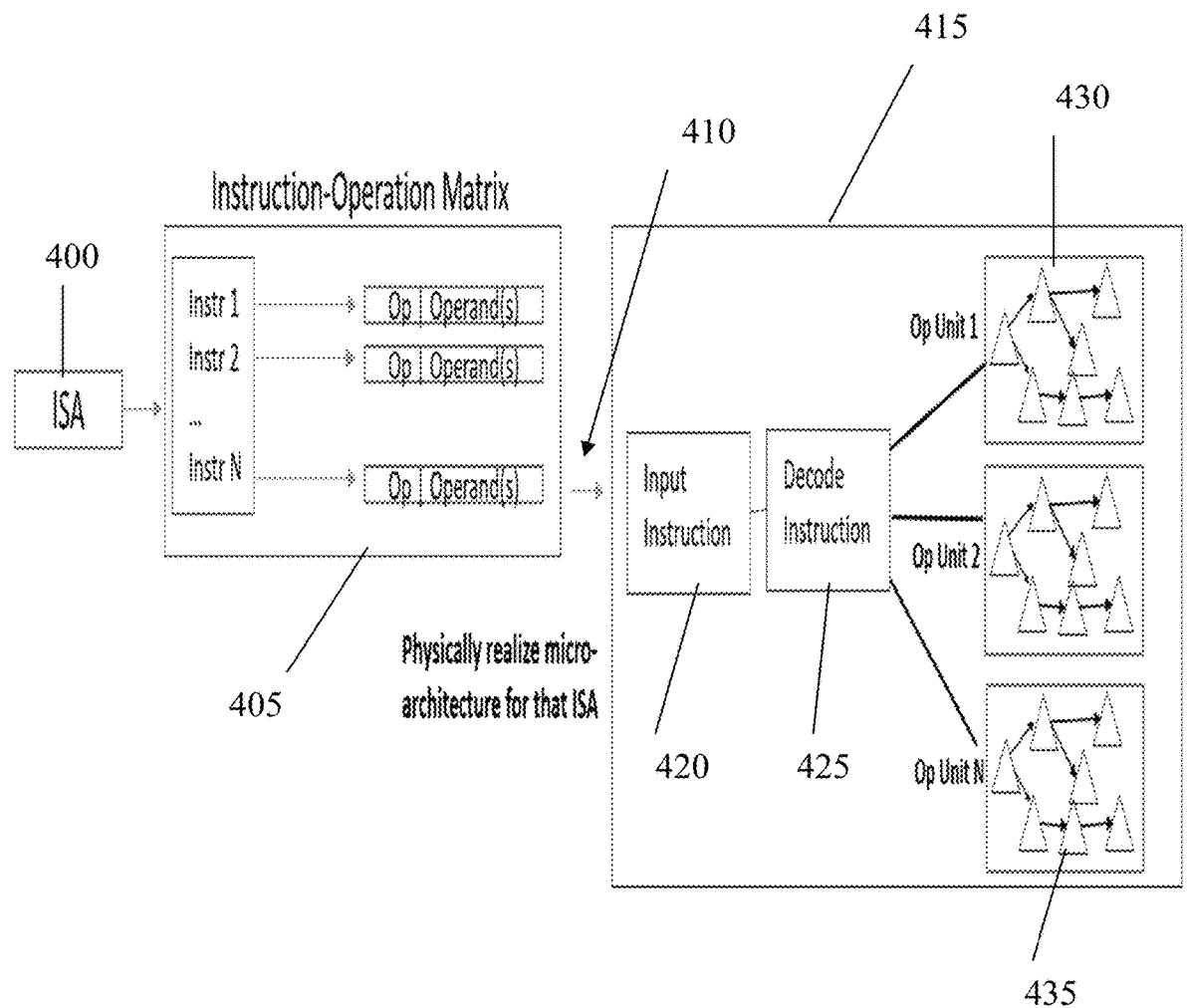
FIG. 7 is a flowchart representing a method of decoding and mapping an instruction set architecture onto a memory micro-unit in accordance with one or more example embodiments.

Referring to FIG. 7, a method of decoding, and mapping an instruction set architecture onto a memory micro-unit according to an example embodiment is shown. In this example, in order to program computing in memory units and micro-units an ISA is initially developed 400. The ISA is expressed as a matrix 405, in which the instructions are identified and objects to be, manipulated are defined. The ISA may be developed externally from the computing systems described above.

The ISA is then transferred 410 in the form of packets to the computing system (not independently illustrated). The control unit 415 of the computing system receives the packets containing the ISA. After the ISA is inputted 420 and decoded 425, the control unit 415 programs groups of computing in memory micro-units 430, and the individual computing in memory micro-units 435 with specific instructions. The programming may include specific code as well as routing instructions, expressing where processed data is outputted.

Figure 8:
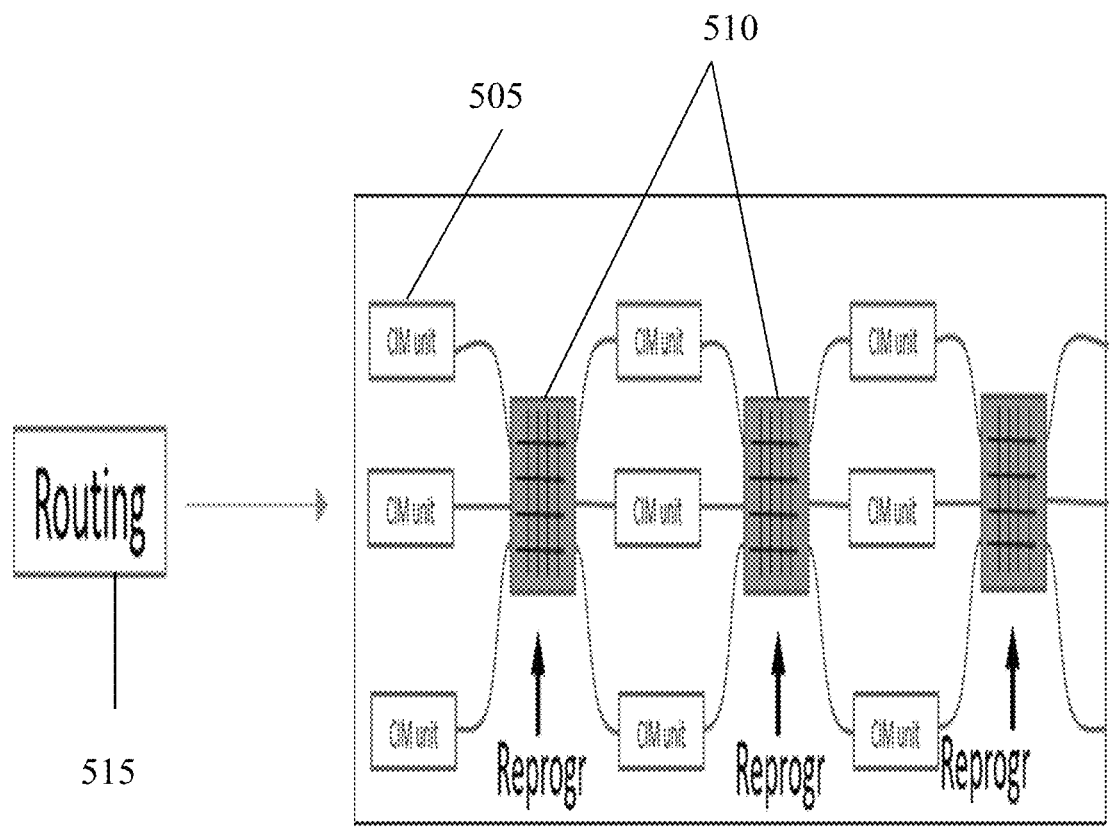
FIG. 8 is a schematic representation of dynamic routing using crossbars interconnecting multiple computing in memory units in accordance with one or more example embodiments.

Referring to FIG. 8, a schematic representation of dynamic routing using crossbars interconnecting multiple computing in memory units according to an example embodiment is shown. In this example a computing system 500 may use dynamic routing, by connecting multiple computing in memory units 505. The computing in memory units 505 are connected using programmable crossbars 510, thereby allowing data passing though the programmable crossbars 510 to be evaluated and sent to a desired location.

As routing instructions 515 are introduced into computing system 500, computing in memory units 505 may process the data and then the computing in memory units 505 may use the routing instructions 515 to determine where to send the processed data. As data is sent from individual computing in memory units 505, the packets of data, may pass through the programmable crossbars 510. The programmable crossbars 510 may then determine where and when the data is sent. Because the programmable crossbars 510 may be connected between multiple computing in memory units 505 and micro-units (not illustrated) data may be rerouted between numerous computing in memory units, Additionally, the programmable crossbars 510 may be dynamically reprogrammed by introducing modified routing instructions 515. Accordingly, a packet-by-packet decision may be made for data passing through the programmable crossbars 510.

Figure 9:
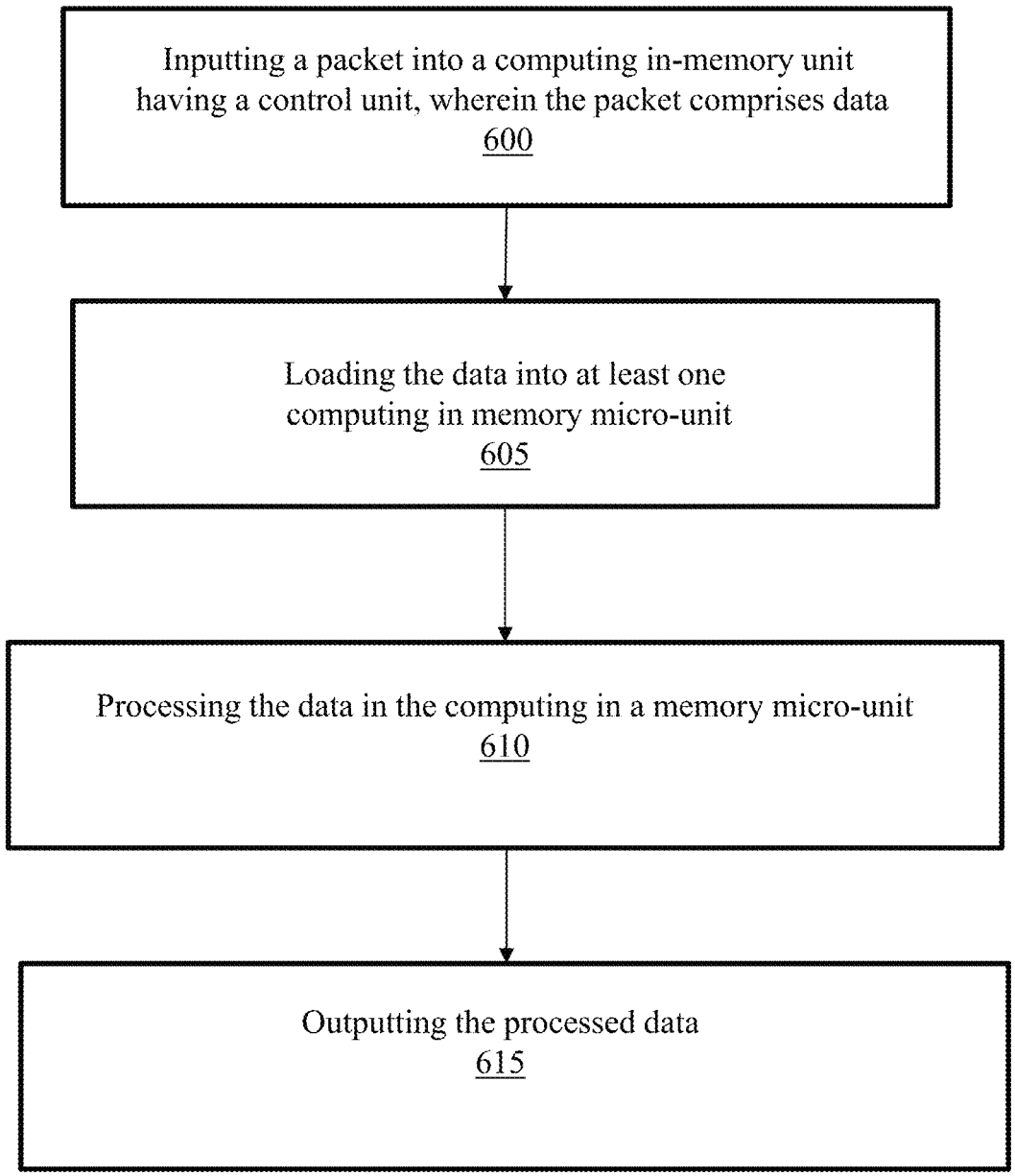
FIG. 9 shows a block diagram of a method of computing in memory in accordance with one or more example embodiments.

Referring to FIG. 9, a block diagram of a method of computing in memory in accordance with one or more example embodiments is shown. Initially, a packet is imputed into a computing in memory unit that has a control unit (600). The packet may include, for example, data that is to be processed by the computing system. Examples of packets, computing in memory units, and control units are described above in detail with respect to FIG. 4.

After data is processed by the control unit, the data may be loaded into at least one computing in memory micro-unit (605). The data may then be processed in the computing in memory micro-unit (610). The processed data may then be outputted to a desired location (615).

In certain implementations, computing systems may already be preprogrammed with an ISA and with programs, so the above method for processing data in a system having computing in memory units and computing in memory micro-units is all that is required. However, in alternative implementations, more complex methods for operating such computer systems may be required. In another example of a computing system, packets containing a program may be received by the control unit. The control unit may then deploy the program to a specific computing in memory micro-unit or a group of such units. When deployed, the program may be executed on the data, thereby providing for the reprogramming of computing in memory units and micro-units as the requirements of the computing operation change.

In certain implementations, the program may be deployed while data is being computed, thereby allowing for the simultaneous or near simultaneous reprogramming and computing in memory units and micro-units. Additionally, the control unit may allow for packets containing program code to be received as required, thereby allowing the computing in memory units and micro-units to be reprogrammed on an as needed basis, allowing for dynamic modifications to the computing system.

In other implementations, a packet may be sent to the control units containing an ISA. The ISA may be used by the control unit to reprogram a number of computing in memory units and/or micro-units. The ISA may further include additional routing instructions and data that may be processed by the control unit and sent to appropriate computing in memory micro-units. Such implementations may be used to modify, extend, or otherwise replace an entire ISA, including relevant programming.

In still other implementations, packets may be sent to the control unit that include routing instructions. Accordingly, the control unit may direct computing in memory units and micro-units to route processed data to specific locations. The routing function may become dynamic as specific packets may be sent with updated routing instructions, thereby allowing the control unit to modify the routing instructions for specific computing in memory units and micro-units. Routing instructions may further provide instructions for determining dynamically an optimal route for the processed data based on a run time parameter. This process may be further modified by passing the processed data through one or more crossbars, as explained with respect to FIG. 8.

In certain implementations, the data is outputted from a computing in memory micro-unit to another micro-unit. However, in certain implementations, the data may be outputted to multiple computing in memory micro-units, may be sent to a computing in memory unit, may be sent to a computing in memory tile, or the processed data may be split between any of the above. In certain implementations, the data may be sent in a closed loop between multiple computing in memory micro-units, as previously described.

The methods described above may be applied to computing in memory micro-units, computing in memory units, and computing in memory tiles, thereby allowing the computing system described herein to be dynamically reprogrammable to fit the needs of a particular computing operation.

Figure 10:
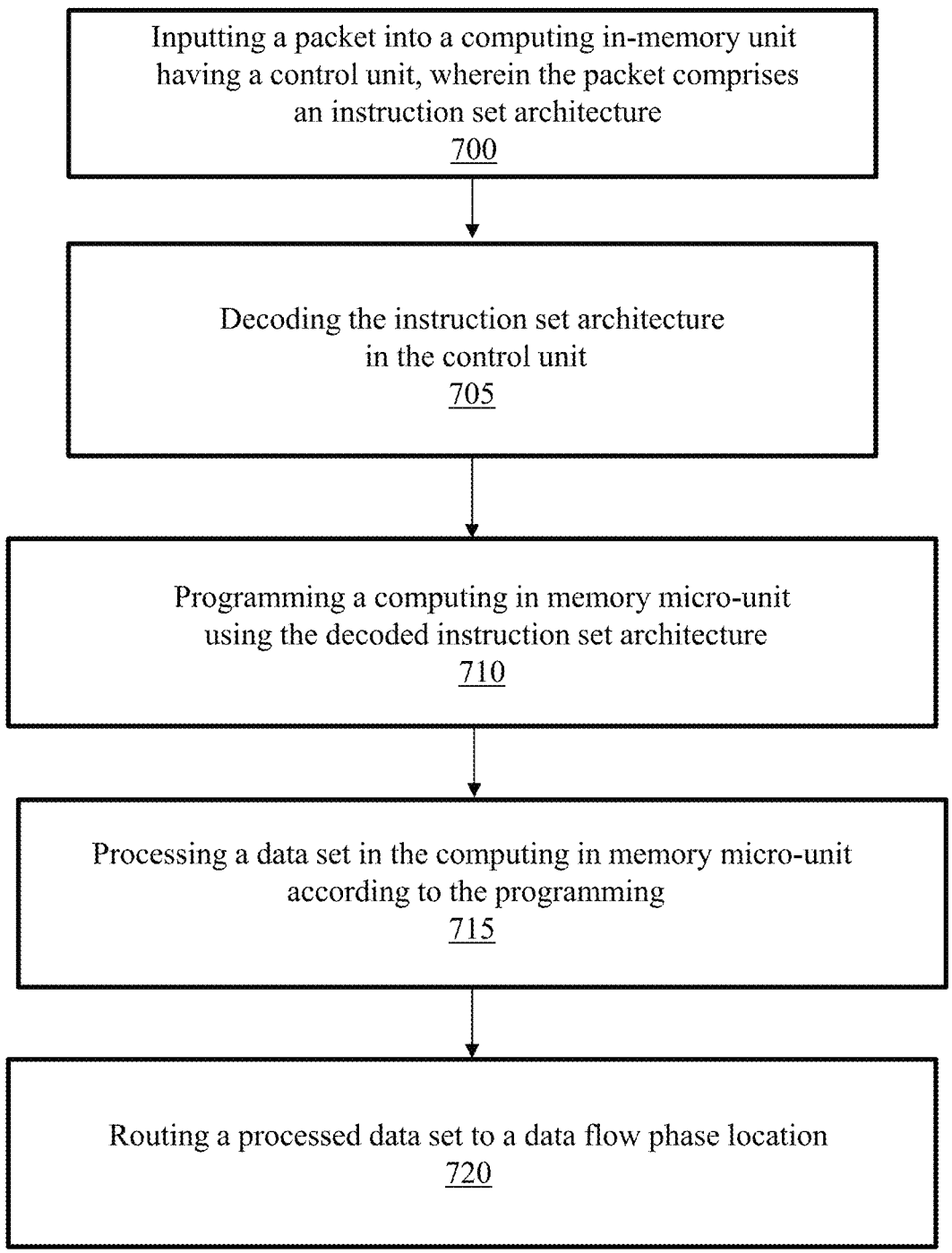
FIG. 10 shows a block diagram of a method of computing in memory in accordance with one or more example embodiments.

Referring to FIG. 10, a block diagram of a method of computing in memory in accordance with one or more example embodiments is shown. In this implementation, initially a packet is inputted into a computing in memory unit that has a control unit, wherein the packet includes an ISA (700). Programs may also be loaded or programs may have previously been loaded into the computing in memory unit. After the ISA packet is received by the control unit, the control unit decodes the ISA (705). The control unit may then use the decoded instructions provided by the ISA to program a computing, in memory micro-unit (710). A data set may then be processed in the computing in memory micro-unit according to the loaded programming. After processing the data set, the processed data set may be routed to the next location in a data flow phase (720).

In certain implementations, additional types of packets may be received and processed by the control unit, such as those discussed above with respect to FIGS. 4, 5, and 9. In one example, the control unit may receive a second packet having a program stored as code, the program may then be processed by the control unit and a computing in memory micro-unit may be reprogrammed based on the provided program. Accordingly, computing in memory micro-units may be reprogrammed on an, as needed basis to fit the requirements of the computing operation.

In other implementations, a control unit may receive a second packet having a routing instruction set. The routing instruction set may be processed by the control unit and the routing of one or more of the computing in memory unit and micro-unit may be reconfigured based on the revised routing instructions. In some examples, the reconfiguring of the routing may modify the location of the data flow phase location. For example, a particular computing in memory micro-unit may be reconfigured to modify a routing location from a single computing in memory micro-unit to multiple micro-units, one or more computing in memory units, a crossbar, or other components of the computing system.

In still other implementations, the programming the computing in memory micro-unit and the processing the data set may occur simultaneously or near simultaneously. For example, computing by a first computing in memory micro-unit will not be affected by the reprogramming of a second computing in memory micro-unit.

The methods described above may be applied to computing in memory micro-units, computing in memory units, and computing in memory tiles, thereby allowing the computing system described herein to be dynamically reprogrammable to fit the needs of a particular computing operation.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

While the present teachings have been described in conjunction with various examples, it is not intended that the present teachings be limited to such examples. The above-described examples may be implemented in any of numerous ways.

Also, the technology described herein may be embodied as a method, of which at least one example has been provided. The acts performed as part of the method may be ordered in any suitable way. Accordingly, examples may be constructed in which acts are performed in an order different than illustrated, which may include performing some acts simultaneously, even though shown as sequential acts in illustrative examples.

Advantages of one or more example embodiments may include one or more of the following:

In one or more examples, systems and methods disclosed herein may be used to increase the programmability and reconfigurability of computing systems.

In one or more examples, systems and methods disclosed herein may be used to increase performance in terms of data throughput.

In one or more examples, systems and methods disclosed herein may be used to decrease power consumption of computing systems.

Not all embodiments will necessarily manifest all these advantages. To the extent that various embodiments may manifest one or more of these advantages, not all of them will do so to the same degree.

While the claimed subject matter has been described with respect to the above-noted embodiments, those skilled in the art, having the benefit of this disclosure, will recognize that other embodiments may be devised that are within the scope of claims below as illustrated by the example embodiments disclosed herein. Accordingly, the scope of the protection sought should be limited only by the appended claims.

What is claimed is:

1. A method of computing in memory, the method comprising:
    inputting a packet including data into a computing in memory unit having a configuration/programming unit, a control unit, and an arithmetic/logic unit, wherein the configuration/programming unit of the computing in memory unit comprises a first processing element and a first memory, and wherein the control unit of the computing in memory unit and arithmetic/logic unit comprise a second and third processing element and a second and third memory;
    splitting the data between the configuration/programming unit on one side and control and the arithmetic/logic unit of the computing in memory unit on another side;
    for data sent to the configuration/programming unit:
        loading the data from the first memory of the configuration/programming unit;
        reprogramming dynamically the control unit and arithmetic/logic unit of the computing in memory unit based on a program stored in the packet;
        deploying the program in the control unit and arithmetic/logic unit of the computing in memory unit;
        processing the data in the control unit; and
        outputting the processed data; and
    for data sent to the control unit of the computing in memory unit and arithmetic/logic unit of the computing in memory unit:
        loading the data in parallel and by the configuration/programming unit from the second memory of the control and arithmetic/logic unit;
        processing the data in the control unit and the arithmetic/logic unit; and
        outputting the processed data.

2. The method of claim 1, wherein the reprogramming dynamically comprises reprogramming the control unit and arithmetic/logic unit of the computing in memory unit at more than one level.

3. The method of claim 2, wherein the level comprises at least one of a logic gate level, an instructions level, an instruction set architecture level, and a routing level.

4. The method of claim 1, wherein the first memory of the configuration/programming unit comprises a memristor device.

5. The method of claim 1, further comprising:
    deploying an instruction set architecture stored in the packet on the computing in memory unit.

6. The method of claim 1, further comprising:
    routing the processed data according to instructions stored in the packet.

7. The method of claim 6 wherein the routing further comprises determining dynamically an optimal route for the processed data based on a run time parameter.

8. The method of claim 1, wherein the data is split based on a type of processing required for the data by the computing in memory unit.

9. The method of claim 1, wherein the data is loaded independently and simultaneously by the configuration/programming unit and by the control unit.

10. A computing in memory system, the system comprising:
    a computing in memory unit having:
        a configuration/programming unit,
        a control unit, and
        an arithmetic/logic unit,
    wherein the configuration/programming unit of the computing in memory unit comprises a first processing element and a first memory, and wherein the control unit of the computing in memory unit and arithmetic/logic unit comprise a second and third processing element and a second and third memory, and
    wherein the computing in memory unit is configured to split the data between the configuration/programming unit on one side and control and the arithmetic/logic unit of the computing in memory unit on another side;
    for data sent to the configuration/programming unit:
        load the data from the first memory of the configuration/programming unit;

reprogram dynamically the control unit and arithmetic/logic unit of the computing in memory unit based on a program stored in the packet;
deploy the program in the control unit and arithmetic/logic unit of the computing in memory unit;
process the data in the control unit; and
output the processed data; and
for data sent to the control unit of the computing in memory unit and arithmetic/logic unit of the computing in memory unit:
loading the data in parallel and by the configuration/programming unit from the second memory of the control and arithmetic/logic unit;
process the data in the control unit and the arithmetic/logic unit; and
output the processed data.

11. The system of claim 10, wherein the control unit and arithmetic/logic unit of the computing in memory unit comprises at least one of a memory matrix and a logic elements matrix.

12. The system of claim 10, further comprising a second computing in memory micro-unit disposed in the computing in memory unit and connected to the computing in memory micro-unit.

13. The system of claim 10, further comprising a second computing in memory unit having a third computing in memory micro-unit, wherein the second computing in memory unit is connected to the computing in memory unit.

14. The system of claim 13, further comprising a programmable crossbar disposed between the computing in memory unit and the second computing in memory unit.

15. A method of computing in memory, the method comprising:
inputting a packet into a computing in memory unit having a configuration/programming unit, a control unit, and an arithmetic/logic unit, wherein the configuration/programming unit of the computing in memory unit comprises a first processing element and a first memory, and wherein the control unit of the computing in memory unit and arithmetic/logic unit comprise a second and third processing element and a second and third memory;
splitting the data between the configuration/programming unit on one side and control and the arithmetic/logic unit of the computing in memory unit on another side;
for data sent to the configuration/programming unit:
decoding the instruction set architecture in the control unit;
programming the control unit and arithmetic/logic unit of the computing in memory unit using the decoded instruction set architecture;
deploying the decoded instruction set architecture in the control unit and arithmetic/logic unit of the computing in memory unit;
processing a data set in the control unit according to the programming;
routing the processed data set to a data flow phase location; and
for data sent to the control unit of the computing in memory unit and arithmetic/logic unit of the computing in memory unit:
loading the data in parallel and by the configuration/programming unit from the second memory of the control and arithmetic/logic unit;
processing the data in the control unit and the arithmetic/logic unit; and
outputting the processed data.

16. The method of claim 15, further comprising receiving a second packet having a program, processing the program in the control unit, and reprogramming the control unit and arithmetic/logic unit of the computing in memory unit based on the program.

17. The method of claim 15, further comprising receiving a second packet having a routing instruction set, processing the routing instruction set in the control unit, and reconfiguring the routing based on the routing instruction set.

18. The method of claim 17, wherein the reconfiguring the routing based on the routing instruction set modifies the location of the data flow phase location.

19. The method of claim 18, wherein the data flow phase location is at least one of a second computing in memory unit and a second computing in memory micro-unit.

20. The system of claim 15, wherein the programming the control unit and arithmetic/logic unit of the computing in memory unit and the processing the data set occur simultaneously.

* * * * *